US012507081B2

(12) United States Patent
Li (10) Patent No.: US 12,507,081 B2
(45) Date of Patent: Dec. 23, 2025

(54) METHOD FOR SIGNAL TRANSMISSION ON REFERENCE SIGNAL RESOURCES AND TERMINAL (71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 413 days.

(21) Appl. No.: 18/003,864

(22) PCT Filed: Aug. 3, 2020

(86) PCT No.: PCT/CN2020/106643
§ 371 (c)(1),
(2) Date: Dec. 29, 2022

(87) PCT Pub. No.: WO2022/027193
PCT Pub. Date: Feb. 10, 2022

(65) Prior Publication Data
US 2023/0262480 A1 Aug. 17, 2023

(51) Int. Cl.
*H04W 16/28* (2009.01)
*H04L 5/00* (2006.01)
(Continued)

(52) U.S. Cl.
CPC .......... *H04W 16/28* (2013.01); *H04L 5/0051* (2013.01); *H04W 24/10* (2013.01); *H04W 72/0446* (2013.01)

(58) Field of Classification Search
CPC ... H04L 5/0051; H04L 5/0023; H04L 5/0048; H04L 5/005; H04L 5/0094; H04W 16/28;
(Continued)

(56) References Cited

U.S. PATENT DOCUMENTS

2018/0192313 A1* 7/2018 Axmon ............. H04W 28/0205
2019/0068262 A1* 2/2019 Yu .................... H04L 5/0048
(Continued)

FOREIGN PATENT DOCUMENTS

CN 109417717 A 3/2019
CN 110036575 A 7/2019
(Continued)

OTHER PUBLICATIONS

English translation of the International Search Report (ISR) for PCT/CN2020/106643 (mailed Apr. 26, 2021); retrieved from the Internet Apr. 10, 2025 (Year: 2025).*
(Continued)

*Primary Examiner* — Benjamin H Elliott, IV
(74) *Attorney, Agent, or Firm* — Oblon, McClelland, Maier & Neustadt, L.L.P.

(57) ABSTRACT

Provided is a method and device for signal transmission. The method can include receiving reference signal resource configuration information, the reference signal resource configuration information including a configuration of at least one reference signal resource set, the reference signal resource set including N reference signal resources, the N reference signal resources having an interval on the time domain that is smaller than a first threshold, and the reference signal resources being used to carry a reference signal for beam management; and transmitting the reference signal on the N reference signal resources.

20 Claims, 6 Drawing Sheets

(51) Int. Cl.
*H04W 24/10* (2009.01)
*H04W 72/0446* (2023.01)

(58) Field of Classification Search
CPC .. H04W 24/10; H04W 72/0446; H04W 24/02
See application file for complete search history.

(56) References Cited

U.S. PATENT DOCUMENTS

| | | | | |
|---|---|---|---|---|
| 2019/0068263 | A1* | 2/2019 | Yu | H04B 7/088 |
| 2019/0081753 | A1* | 3/2019 | Jung | H04L 1/1854 |
| 2019/0349964 | A1* | 11/2019 | Liou | H04B 7/0626 |
| 2020/0036424 | A1* | 1/2020 | Kang | H04B 7/0626 |
| 2020/0100193 | A1* | 3/2020 | Cheng | H04W 52/146 |
| 2020/0154413 | A1* | 5/2020 | Hosseini | H04W 72/0446 |
| 2020/0358574 | A1* | 11/2020 | Jung | H04B 7/0628 |
| 2020/0374725 | A1* | 11/2020 | Chen | H04L 5/0053 |
| 2020/0413488 | A1* | 12/2020 | Han | H04L 5/0051 |
| 2021/0185632 | A1* | 6/2021 | Manolakos | H04L 1/0013 |
| 2021/0258898 | A1* | 8/2021 | Ma | H04L 5/0053 |
| 2021/0321436 | A1* | 10/2021 | Nam | H04L 5/0051 |
| 2021/0336667 | A1* | 10/2021 | Bengtsson | H04B 7/0469 |
| 2021/0336737 | A1* | 10/2021 | Li | H04L 5/0051 |
| 2022/0368405 | A1* | 11/2022 | Shi | H04B 7/0874 |
| 2023/0009319 | A1* | 1/2023 | Manolakos | H04L 27/261 |
| 2023/0014273 | A1* | 1/2023 | Wu | H04W 52/42 |
| 2023/0171062 | A1* | 6/2023 | Khoshnevisan | H04L 5/0085 370/329 |
| 2023/0262480 | A1* | 8/2023 | Li | H04L 5/0051 370/329 |
| 2023/0337229 | A1* | 10/2023 | Cui | H04L 5/0048 |
| 2024/0179032 | A1* | 5/2024 | Eistein | H04L 25/0224 |
| 2024/0195553 | A1* | 6/2024 | Manolakos | H04L 5/0091 |
| 2024/0214150 | A1* | 6/2024 | Xiao | H04B 7/0695 |

FOREIGN PATENT DOCUMENTS

| | | |
|---|---|---|
| CN | 111052627 A | 4/2020 |
| CN | 111107633 A | 5/2020 |
| CN | 111295847 A | 6/2020 |
| EP | 3 651 528 A1 | 5/2020 |
| WO | WO 2020/057383 A1 | 3/2020 |
| WO | WO 2020/063560 A1 | 4/2020 |

OTHER PUBLICATIONS

"UL SRS design for beam management and CSI acquisition"; Huawei et al.; 3GPP TSG RAN WG1 Meeting #90 R1-1712238 Prague, Czech Republic, Aug. 21-25, 2017 (Year: 2017).*
"Discussion on beam measurement and reporting"; ZTE; 3GPP TSG RAN WG1 Meeting #90 R1-1712297 Prague, Czechia, Aug. 21-25, 2017 (Year: 2017).*
"On the General Framework of CSI and Beam Management"; Nokia et al.; 3GPP TSG-RAN WG1#90 R1-1714243 Prague, Czech Republic, Aug. 21-25, 2017 (Year: 2017).*
"SRS transmission for beam management"; Nokia et al.; 3GPP TSG RAN WG1 Meeting #90 R1-1714250 Prague, Czech Republic, Aug. 21-25, 2017 (Year: 2017).*
"Codebook Design for Beamformed CSI-RS"; Huawei et al.; 3GPP TSG RAN WG1 Meeting #90 R1-1714343 Prague, Czech Republic, Aug. 21-25, 2017 (Year: 2017).*
International Search Report mailed on Apr. 26, 2021 in PCT/CN2020/106643 filed on Aug. 3, 2020, 4 pages.
"On Efficient UL Beam Management", 3GPP TSG RAN WG1 Meeting #90, R1-1714143 , Interdigital, Inc., 2017, 4 pages.
Chinese Office Action issued May 20, 2021 in Chinese Patent Application No. 202080001849.4 (with English translation), 17 pages.
Notification to Grant Patent Right for Invention issued Jan. 12, 2022 in Chinese Patent Application No. 202080001849.4 (with English translation), 4 pages.

* cited by examiner

METHOD FOR SIGNAL TRANSMISSION ON REFERENCE SIGNAL RESOURCES AND TERMINAL

CROSS-REFERENCE TO RELATED APPLICATIONS

The present application is a U.S. National Stage of International Application No. PCT/CN2020/106643 filed on Aug. 3, 2020, the entire contents of which are incorporated herein by reference for all purposes.

TECHNICAL FIELD

The present disclosure relates to the field of communication technology, and particularly, to a method and device for signal transmission, terminal, apparatus and medium.

BACKGROUND

In 5G New Radio (NR) technology, particularly when the communication frequency band is within the Frequency Range 2 (FR2) band, because of the fast attenuation of the high frequency channel, it is required to use beam-based transmission and reception to ensure coverage.

In the relevant technology, a network-side device, when having a plurality of transmission reception points (TRPs), may use the plurality of TRPs to send data to one terminal at the same time, and the terminal, when having a plurality of antenna panels, may use the plurality of antenna panels to receive data from the network-side device.

However, in a beam management phase, there is no clear definition of how beam measurement is to be performed for the terminal having a plurality of antenna panels.

SUMMARY

Embodiments of the present disclosure provide a method and device for signal transmission, terminal, apparatus and medium, and the technical solution thereof is as follows.

According to a first aspect of the present disclosure, a method for signal transmission is provided. The method includes: receiving reference signal resource configuration information, the reference signal resource configuration information being configured to indicate a configuration of at least one reference signal resource set, the reference signal resource set corresponding to N reference signal resources, an interval, by which the N reference signal resources are spaced apart in a time domain, being smaller than a first threshold, and the reference signal resource being configured to carry a reference signal for beam management; and transmitting the reference signal on the N reference signal resources, wherein N is an integer greater than 1.

According to a second aspect of the present disclosure, a method for signal transmission is provided. The method includes:
sending reference signal resource configuration information, the reference signal resource configuration information being configured to indicate a configuration of at least one reference signal resource set, the reference signal resource set corresponding to N reference signal resources, an interval, by which the N reference signal resources are spaced apart in a time domain, being smaller than a first threshold, and the reference signal resource being configured to carry a reference signal for beam management; and
transmitting the reference signal on the N reference signal resources,
wherein N is an integer greater than 1.

According to third aspect of the present disclosure, a device for signal transmission is provided. The device includes:
a receiving module, configured to receive reference signal resource configuration information, the reference signal resource configuration information being configured to indicate a configuration of at least one reference signal resource set, the reference signal resource set corresponding to N reference signal resources, an interval, by which the N reference signal resources are spaced apart in a time domain, being smaller than a first threshold, and the reference signal resource being configured to carry a reference signal for beam management; and
a transmitting module, configured to transmit the reference signal on the N reference signal resources,
wherein N is an integer greater than 1.

According to fourth aspect of the present disclosure, a device for signal transmission is provided. The device includes:
a sending module, configured to send reference signal resource configuration information, the reference signal resource configuration information being configured to indicate a configuration of at least one reference signal resource set, the reference signal resource set corresponding to N reference signal resources, an interval, by which the N reference signal resources are spaced apart in a time domain, being smaller than a first threshold, and the reference signal resource being configured to carry a reference signal for beam management; and
a transmitting module, configured to transmit the reference signal on the N reference signal resources,
wherein N is an integer greater than 1.

According to a fifth aspect of the present disclosure, a network-side device is provided. The device includes:
a processor; and
a memory, storing executable instructions by the processor,
wherein the processor is configured to load and perform the executable instructions to implement any of the above method for signal transmission.

According to a sixth aspect of the present disclosure, a terminal is provided. The terminal includes:
a processor; and
a memory, storing executable instructions by the processor,
wherein the processor is configured to load and perform the executable instructions to implement the any of the above method for signal transmission.

According to a seventh aspect of the present disclosure, a computer-readable storage medium is provided. The storage medium has instructions stored thereon that when being executed by a processor, cause the processor to implement the method for signal transmission according to the first or second aspect.

It is to be understood that the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principle of the present disclosure.

DETAILED DESCRIPTION

Some embodiments will be described in detail herein, examples of which are illustrated in the accompanying drawings. When the following description is made with reference to the drawings, the same numerals in different drawings refer to the same or similar elements unless otherwise indicated. The implementations described in the exemplary embodiments below are not intended to represent all implementations of the embodiments of the present disclosure. Rather, they are merely examples of devices and methods according to some aspects of the embodiments of the present disclosure as recited in the appended claims.

The terminology used in the embodiments of the present disclosure is for the purpose of describing particular embodiments only and is not intended to limit the embodiments of the present disclosure. As used in the embodiments of the present disclosure and the appended claims, the singular forms "a", "an" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third and the like may be used in the embodiments of the present disclosure to describe various pieces of information, such information should not be limited by these terms. These terms are only used to distinguish the same type of information from each other. For example, first information may also be referred to as second information, and similarly, the second information may also be referred to as the first information, without departing from the scope of the embodiments of the present disclosure. Depending on the context, the word "if" as used herein may be interpreted as "at the time of" or "when" or "in response to determining".

It should be understood that although the steps are described in the embodiments of the present disclosure by way of numbering for ease of understanding, the numbering does not represent an order in which the steps are performed, nor does it mean that the sequentially numbered steps must be performed together. It should be understood that one or more of the sequentially numbered steps may be performed individually to solve a corresponding technical problem and achieve an intended technical solution. Even though the steps are exemplarily listed together in the accompanying drawings, this does not mean that these steps must be performed together, which is merely for ease of understanding.

Figure 1:
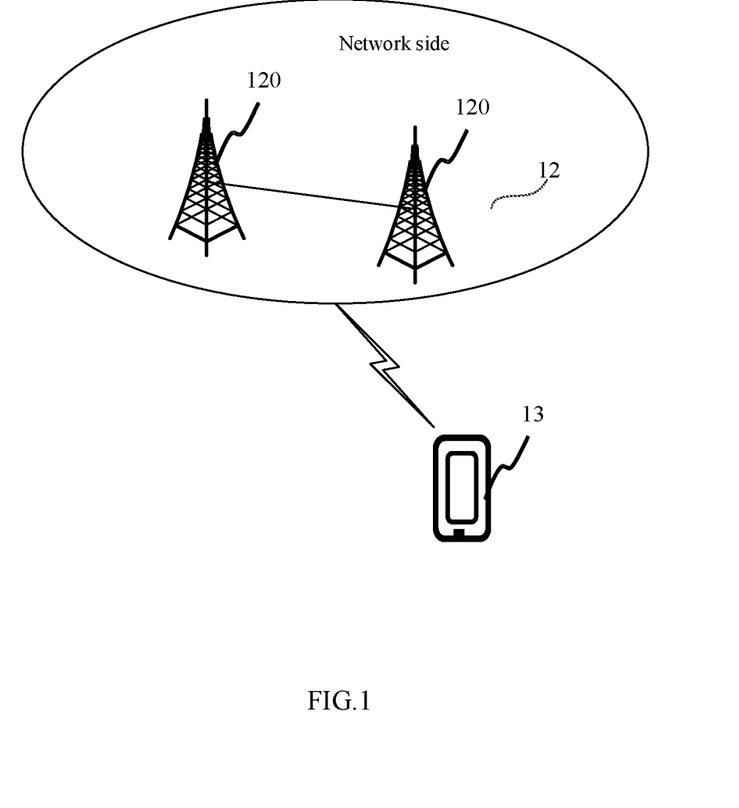
FIG. 1 illustrates a block diagram of a communication system according to an embodiment of the present disclosure.

FIG. 1 illustrates a block diagram of a communication system according to an embodiment of the present disclosure. The communication system may include a network side 12 and a terminal 13, as shown in FIG. 1.

The network side 12 includes a number of network-side devices 120. The network-side device 120 may be a base station, which is a device deployed in an access network to provide a wireless communication function for a terminal. The base station may be either a base station for a cell serving the terminal 13 or a base station for a cell adjacent to the cell serving the terminal 13. The base station may include various macro base stations, micro base stations, relay stations, access points, transmission reception points (TRPs) and the like. In systems using different radio access technologies, the name of the device with the base station function may vary, and in the 5G NR system, it is called gNodeB or gNB. The name "base station" may change as the communication technology develops. The network-side device 120 may also be a location management function (LMF) entity.

The terminal 13 may include various handheld devices, in-vehicle devices, wearable devices, computing devices or other processing devices connected to a wireless modem which have a wireless communication function, and various forms of user devices, mobile station (MS), terminals, Internet of Things (IoT) devices, Industrial Internet of Things (IIoT) devices and the like. For ease of description, the above mentioned devices are collectively referred to as terminals. The network-side device 120 and the terminal 13 communicate with each other via a radio technology, for example a Uu interface.

In an embodiment of the present disclosure, the network-side device 12 has one or more transmission reception points (TRPs), also known as transmission points, each with one or more antenna panels. A plurality of TRPs may simultaneously transmit data to and from a single terminal 12.

The terminal 13 has at least two antenna panels, and the direction of the received beam of that antenna panel may be changed by adjusting a parameter of the antenna panel.

The communication system and the service scenario described in the embodiment of the present disclosure are intended to illustrate the technical solution of the embodiment of the present disclosure more clearly and do not constitute a limitation of the technical solution provided by the embodiment of the present disclosure. It is known to those skilled in the art that the technical solution provided by the embodiment of the present disclosure may be applied to a similar technical problem as the communication system develops and a new service scenario emerges.

Figure 2:
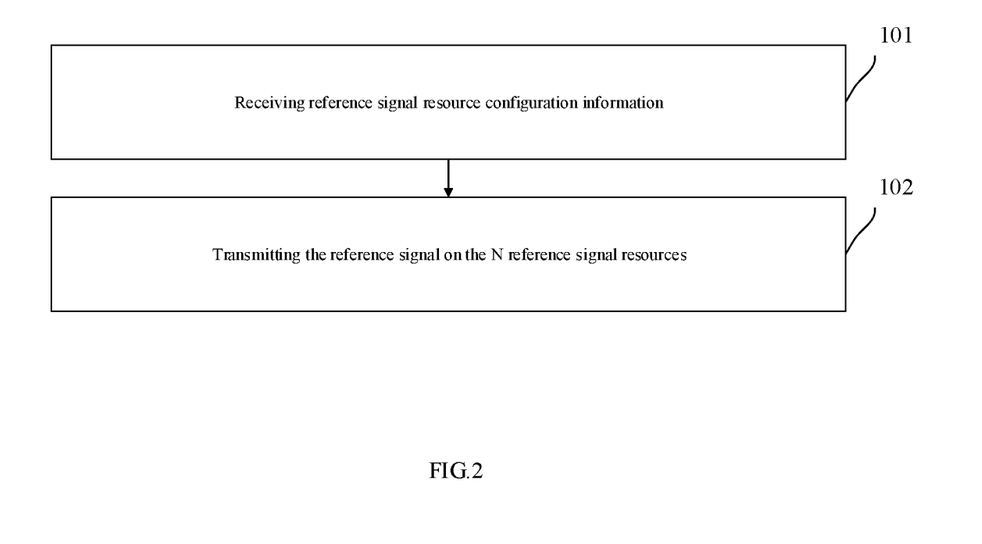
FIG. 2 is a flowchart of a method for signal transmission according to an embodiment.

FIG. 2 is a flowchart illustrating a method for signal transmission according to an embodiment. The method may be performed by a terminal, and referring to FIG. 2, the method includes the following steps.

In step 101, reference signal resource configuration information is received.

The reference signal resource configuration information is configured to indicate a configuration of at least one reference signal resource set, the reference signal resource set includes to N reference signal resources, an interval, by which the N reference signal resources are spaced apart in a time domain, is smaller than a first threshold, and the reference signal resource is configured to carry a reference signal for beam management, where N is an integer greater than 1.

In some embodiments of the present disclosure, the reference signal resource configuration information may indicate the configuration of the reference signal resource set itself, i.e., the configuration of the reference signal resource set includes the configuration of at least one reference signal resource sets, and the configuration of the reference signal resource set includes parameter values of the N reference signal resources themselves.

In other embodiments of the present disclosure, the reference signal resource configuration information may indicate an identification corresponding to the configuration of the reference signal resource set, i.e., the configuration of the reference signal resource set includes an identification of the configuration of at least one reference signal resource set, and the correspondence between the configuration of the reference signal resource set and the identification is as specified in the communication protocol; or, the correspondence between the configuration of the reference signal resource set and the identification is pre-stored in the terminal; or, the correspondence between the configuration of the reference signal resource set and the identification is sent to the terminal from the network side.

In further embodiments of the present disclosure, the reference signal resource configuration information may indicate the identification of the configuration of the reference signal resource set, or may indicate the identification of the N reference signal resources. The correspondence between the reference signal resource and the identification is specified by a communication protocol; or, the correspondence between the reference signal resource and the identification is pre-stored in the terminal; or, the correspondence between the reference signal resource and the identification is sent to the terminal from the network side.

In some further embodiments of the present disclosure, the reference signal resource configuration information may indicate the configuration of the reference signal resource set itself and indicate the identification of the parameter values of the N reference signal resources. Alternatively, the reference signal resource configuration information may indicate the identification of the configuration of the reference signal resource set and indicate the parameter values of the N reference signal resources themselves. Alternatively, the reference signal resource configuration information may indicate the identification of the configuration of the reference signal resource set and indicate the identification of the parameter values of the N reference signal resources. Alternatively, the reference signal resource configuration information may indicate the configuration of the reference signal resource set and indicate the parameter values of the N reference signal resources.

In step 102, the reference signal is transmitted on the N reference signal resources.

In the embodiment of the present disclosure, since the interval, by which the N reference signal resources in the same reference signal resource set are spaced apart in the time domain, is smaller than the first threshold, the terminal may transmit the reference signal for beam management on the N reference signal resources simultaneously through a plurality of antenna panels, and since each reference signal corresponds to one beam of the network-side device, the beam management may be performed based on a plurality of reference signals transmitted simultaneously, which is conducive to improving the efficiency of beam management.

In some embodiments, any two of the N reference signal resources are a first reference signal resource and a second reference signal resource, and the first reference signal resource and the second reference signal resource satisfy any one of the following relationships:

the first reference signal resource and the second reference signal resource occupy the same one or more symbols in the time domain; and the first reference signal resource and the second reference signal resource occupy different symbols in the time domain, a number of symbol intervals between an end symbol occupied by the first reference signal resource and a start symbol occupied by the second reference signal resource is greater than or equal to 0 and smaller than X, and the end symbol occupied by the first reference signal resource is earlier than the start symbol occupied by the second reference signal resource, exemplarily, X is a set value and is a positive integer, in some possible embodiments, the number of symbol intervals between the end symbol occupied by the first reference signal resource and the start symbol occupied by the second reference signal resource is 0.

In some embodiments, the configuration of the reference signal resource includes at least one of a reference signal identification corresponding to the reference signal resource, a time domain resource of the reference signal resource, a frequency domain resource of the reference signal resource, and a number of antenna ports of the reference signal resource.

In some embodiments, the configuration of the reference signal resource further includes: a terminal-side antenna panel identification and/or a network-side device antenna panel identification corresponding to the reference signal resource.

In some embodiments, the reference signal resource configuration information includes a configuration of at least two reference signal resource sets, an interval in the time domain between any reference signal resource in one of the reference signal resource sets and any reference signal resource in another one of the reference signal resource sets is greater than or equal to a second threshold, and the second threshold is greater than or equal to the first threshold.

In some embodiments, the N reference signal resources correspond to N transmission reception points (TRPs) of the network-side device.

In some embodiments, transmitting the reference signal for the beam management on the N reference signal resources includes:

sending the reference signal on different reference signal resources by using different antenna panels, the different antenna panels corresponding to different reference signal resources; or receiving the reference signal on the reference signal resources by using the different antenna panels.

In some embodiments, the reference signal sent includes an SRS; and the reference signal received includes at least one of the following signals: SSB, CSI-RS, PRS.

In some embodiments, the method further comprising.

performing a beam measurement based on the reference signal received; and sending a beam measurement report.

In some embodiments, the beam measurement report is a group-based beam measurement report, the group-based beam measurement report includes identifications of M reference signals and measurement values of the M reference signals, the M reference signals are from the reference signals sent through the N reference signal resources, and M is an integer greater than 0 and smaller than or equal to N.

In some embodiments, the beam measurement report includes an identification of a first reference signal and an absolute measurement value of the first reference signal, an identification of a second reference signal and a relative measurement value of the second reference signal, and the relative measurement value of the second reference signal is a difference between the absolute measurement value of the second reference signal and the absolute measurement value of the first reference signal.

In some embodiments, the method further includes: sending an indication message for indicating a number of antenna panels of the terminal, N being smaller than or equal to the number indicated by the indication message.

It should be noted that the aforementioned steps 101 to 102 and the aforementioned optional steps may be combined in any way.

Figure 3:
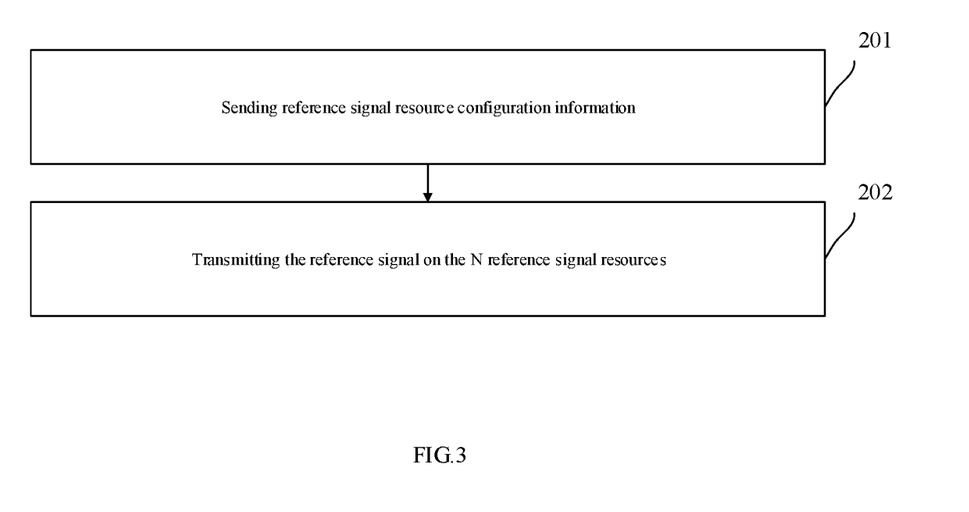
FIG. 3 is a flowchart of a method for signal transmission according to an embodiment.

FIG. 3 is a flowchart illustrating a method for signal transmission according to an embodiment. The method may be performed by a network-side device, and referring to FIG. 3, the method includes:

step 201, sending reference signal resource configuration information, the reference signal resource configuration information including a configuration of at least one reference signal resource set, the reference signal resource set including N reference signal resources, an interval, by which the N reference signal resources are spaced apart in a time domain, being smaller than a first threshold, and the reference signal resource being configured to carry a reference signal for beam management;

step 202, transmitting the reference signal on the N reference signal resources, wherein N is an integer greater than 1.

In some embodiments of the present disclosure, the reference signal resource configuration information may indicate the configuration of the reference signal resource set itself, i.e., the configuration of the reference signal resource set includes the configuration of at least one reference signal resource set, and the configuration of the reference signal resource set includes parameter values of the N reference signal resources themselves.

In other embodiments of the present disclosure, the reference signal resource configuration information may indicate an identification corresponding to the configuration of the reference signal resource set, i.e., the configuration of the reference signal resource set includes an identification of the configuration of at least one reference signal resource set, and the correspondence between the configuration of the reference signal resource set and the identification is as specified in the communication protocol; or, the correspondence between the configuration of the reference signal resource set and the identification is pre-stored in the terminal; or, the correspondence between the configuration of the reference signal resource set and the identification is sent to the terminal from the network side.

In further embodiments of the present disclosure, the reference signal resource configuration information may indicate the identification of the configuration of the reference signal resource set, or may indicate the identification of the N reference signal resources. The correspondence between the reference signal resource and the identification is specified by a communication protocol; or, the correspondence between the reference signal resource and the identification is pre-stored in the terminal; or, the correspondence between the reference signal resource and the identification is sent to the terminal from the network side.

In some further embodiments of the present disclosure, the reference signal resource configuration information may indicate the configuration of the reference signal resource set itself and indicate the identification of the parameter values of the N reference signal resources. Alternatively, the reference signal resource configuration information may indicate the identification of the configuration of the reference signal resource set and indicate the parameter values of the N reference signal resources themselves. Alternatively, the reference signal resource configuration information may indicate the identification of the configuration of the reference signal resource set and indicate the identification of the parameter values of the N reference signal resources. Alternatively, the reference signal resource configuration information may indicate the configuration of the reference signal resource set and indicate the parameter values of the N reference signal resources.

In the embodiment of the present disclosure, since the interval, by which the N reference signal resources in the same reference signal resource set are spaced apart in the time domain, is smaller than the first threshold, the terminal may transmit the reference signal for beam management on the N reference signal resources simultaneously through a plurality of antenna panels, and since each reference signal corresponds to one beam of the network-side device, the beam management may be performed based on a plurality of reference signals transmitted simultaneously, which is conducive to improving the efficiency of beam management.

In some embodiments, any two of the N reference signal resources are a first reference signal resource and a second reference signal resource, and the first reference signal resource and the second reference signal resource satisfy any one of the following relationships:

the first reference signal resource and the second reference signal resource occupy the same one or more symbols in the time domain; and the first reference signal resource and the second reference signal resource occupy different symbols in the time domain, a number of symbol intervals between an end symbol occupied by the first reference signal resource and a start symbol occupied by the second reference signal resource is smaller than X, and the end symbol occupied by the first reference signal resource is earlier than the start symbol occupied by the second reference signal resource, exemplarily, X is a set value and is a positive integer, in some possible embodiments, the number of symbol intervals between the end symbol occupied by the first reference signal resource and the start symbol occupied by the second reference signal resource is 0.

In some embodiments of the present disclosure, the time interval between the N reference signal resources is less than a threshold. In some embodiments of the present disclosure, the threshold is the time required to switch between different beam directions on the same panel of the terminal. In some other embodiments of the present disclosure, the threshold is determined based on the time required to switch between beam directions on the same panel of the terminal, for example, the product of the time required to switch between beam directions on the same panel of the terminal and a factor. In some embodiments, the factor is not less than 1. In yet other embodiments, the factor is not greater than 1.

In some embodiments, a configuration of the reference signal resource includes at least one of a reference signal identification corresponding to the reference signal resource, a time domain resource of the reference signal resource, a frequency domain resource of the reference signal resource, and a number of antenna ports of the reference signal resource.

In some embodiments, the configuration of the reference signal resource further includes: a terminal-side antenna panel identification and/or a network-side device antenna panel identification corresponding to the reference signal resource.

In some embodiments, the reference signal resource configuration information includes a configuration of at least two reference signal resource sets, an interval in the time domain between any reference signal resource in one of the reference signal resource sets and any reference signal resource in another one of the reference signal resource sets is greater than or equal to a second threshold, and the second threshold is greater than or equal to the first threshold.

In some embodiments, the transmitting the reference signal for the beam management on the N reference signal resources includes:

sending the reference signal on different reference signal resources through N transmission reception points (TRPs), the reference signal resources used by different TRPs being different; or receiving the reference signal on the different reference signal resources through the N transmission reception points (TRPs), the reference signal resources used by the different TRPs being different.

In some embodiments, the reference signal received includes a sounding reference signal (SRS); and the reference signal sent includes at least one of a synchronization signal block (SSB), a channel state information reference signal (CSI-RS), and a positioning reference signal (PRS).

In some embodiments, the N transmission reception points (TRPs) belong to one or more network-side devices.

In some embodiments, the method further includes:

receiving a beam measurement report, wherein the beam measurement report is a group-based beam measurement report, the group-based beam measurement report includes identifications of M reference signals and measurement values of the M reference signals, the M reference signals are from the reference signals sent through the N reference signal resources, and M is an integer greater than 0 and smaller than or equal to N.

In some embodiments, the method further includes:

receiving a beam measurement report, wherein the beam measurement report includes an identification of a first reference signal and an absolute measurement value of the first reference signal, an identification of a second reference signal and a relative measurement value of the second reference signal, and the relative measurement value of the second reference signal is a difference between the absolute measurement value of the second reference signal and the absolute measurement value of the first reference signal.

In some embodiments, the method further includes:

receiving an indication message for indicating a number of antenna panels of a terminal, N being smaller than or equal to the number indicated by the indication message.

It should be noted that the aforementioned steps 201 to 202 and the aforementioned optional steps can be combined in any way.

Figure 4:
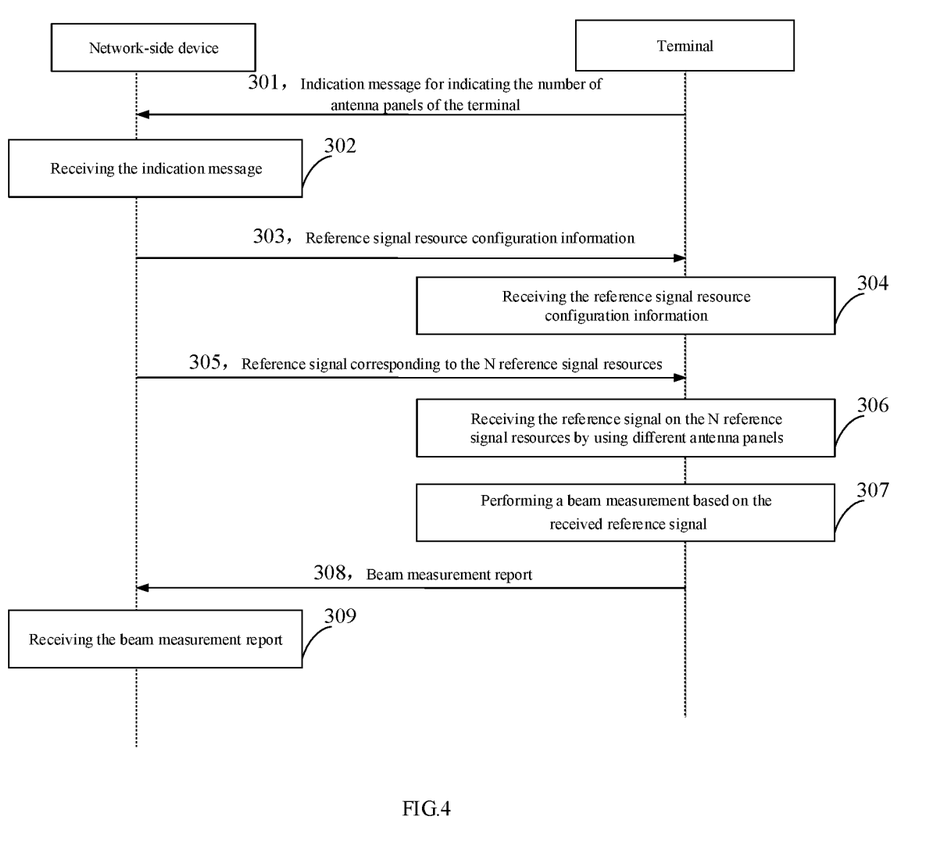
FIG. 4 is a flowchart of a method for signal transmission according to an embodiment.

FIG. 4 is a flow chart of a method for signal transmission according to an embodiment. Referring to FIG. 4, the method comprises the following steps.

In step 301, a terminal sends an indication message for indicating the number of antenna panels of the terminal.

In an embodiment of the present disclosure, the terminal has L antenna panels, L being an integer greater than 1.

In some embodiments, the indication information may further include an identification of the antenna panels of the terminal.

In some embodiments, the terminal sends the indication message via a non-access stratum (NAS) or radio resource control (RRC) message. For example, the terminal sends the indication message via the RRC message when switching to a connected state. Alternatively, the terminal sends the indication message via the NAS message to a core network device, which then sends the indication message to a network-side device such as a base station.

In step 302, the network-side device receives the indication message.

With the steps 301 and 302, the terminal can report the number of the antenna panels thereof to the network-side device.

In step 303, the network-side device sends the reference signal resource configuration information.

In some embodiments, the network-side device sends the reference signal resource configuration information via an RRC message.

The reference signal resource configuration information includes at least one reference signal resource configuration set, and each reference signal resource configuration set includes a configuration of N reference signal resources with a time interval less than a first threshold. Here, N is an integer greater than 1 and not greater than L, i.e., N is less than or equal to the number of antenna panels of the terminal. In an embodiment, the reference signal resource is a downlink reference signal resource, i.e., the reference signal is sent by the network-side device and received by the terminal-side device.

For example, the first threshold is a time required to switch between different beam directions on the same antenna panel of the terminal.

In some embodiments, any two of the N reference signal resources are a first reference signal resource and a second reference signal resource, and the first reference signal resource and the second reference signal resource satisfying any one of the following relationships:

the first reference signal resource and the second reference signal resource occupy the same one or more symbols in the time domain, for example, the first reference signal resource and the second reference signal resource occupy exactly or partially the same symbols in the time domain; and the first reference signal resource and the second reference signal resource occupy different symbols in the time domain, a number of symbol intervals between an end symbol occupied by the first reference signal resource and a start symbol occupied by the second reference signal resource is greater than or equal to 0 and smaller than X, and the end symbol occupied by the first reference signal resource is earlier than the start symbol occupied by the second reference signal resource, in some possible embodiments, the number of symbol intervals between the end symbol occupied by the first reference signal resource and the start symbol occupied by the second reference signal resource is 0, exemplarily, X is a set value and is a positive integer.

In some embodiments of the present disclosure, the time interval between the N reference signal resources is less than a threshold. In some embodiments of the present disclosure, the threshold is the time required to switch between different beam directions on the same panel of the terminal. In some other embodiments of the present disclosure, the threshold is determined based on the time required to switch between beam directions on the same panel of the terminal, for example, the product of the time required to switch between beam directions on the same panel of the terminal and a factor. In some embodiments, the factor is not less than 1. In yet other embodiments, the factor is not greater than 1.

In some embodiments, a configuration of the reference signal resource includes at least one of the following parameters: a reference signal identification corresponding to the reference signal resource, a time domain resource of the reference signal resource, a frequency domain resource of the reference signal resource, and a number of antenna ports of the reference signal resource.

In some embodiments, the configuration of the reference signal resource further includes: a terminal-side antenna panel identification and/or a network-side device antenna panel identification corresponding to the reference signal resource. Here, the terminal-side antenna panel identification corresponding to the reference signal resource is configured to indicate that the terminal receives the reference signal on the corresponding reference signal resource by using the antenna panel indicated by the terminal-side antenna panel identification, and the network-side device antenna panel identification corresponding to the reference signal resource is configured to indicate that the network-side device sends the reference signal on the corresponding reference signal resource by using the antenna panel indicated by the network-side device antenna panel identification.

In a possible implementation, the reference signal resource configuration information includes a configuration of at least two reference signal resource sets, the interval in the time domain between any reference signal resource in one of the reference signal resource sets and any reference signal resource in another one of the reference signal resource sets is not smaller than a second threshold, and the second threshold is greater than or equal to the first threshold.

In a possible implementation, any two reference signal resources in different reference signal resource sets may correspond to the same network-side device antenna panel identification or the same terminal-side device antenna panel identification.

In step 304, the terminal receives the reference signal resource configuration information.

In a possible implementation, the terminal, based on the reference signal resource configuration information, determines that there are a plurality of reference signal resources which are spaced apart by an interval smaller than a threshold in the time domain, and actively employs a plurality of antenna panels of the terminal to receive the reference signal corresponding to the plurality of reference signal resources.

In step 305, the network-side device provides beams in different directions via the N TRPs and sends the reference signal corresponding to the N reference signal resources via the beams in the different directions.

In some embodiments, the N TRPs belong to the same network-side device or different network-side devices.

In some embodiments, each TRP includes only one panel. In another embodiment, each TRP includes a plurality of panels, and different panels of the same TRP may also provide beams in different directions, then the network-side devices may use different panels to send the reference signal on different reference signal resources.

In the step 305, different TRPs provide beams in different directions, and reference signals sent on different beams are different, i.e., each beam sends a reference signal corresponding to one of the N reference signal resources.

In some embodiments, the reference signal sent includes, but is not limited to, at least one of SSB (Synchronization Signal and PBCH Block), CSI-RS (Channel State Information-Reference Signal), and PRS (Positioning Reference Signal).

In step 306, the terminal receives the reference signal on the N reference signal resources by using different antenna panels.

In different transmission environments, for any reference signal sent by the network-side device, the terminal may have one or more antenna panels which have received this reference signal, or, the terminal may have no antenna panels capable of receiving the reference signal.

In step 307, the terminal performs a beam measurement based on the received reference signal to obtain a measurement value corresponding to each reference signal.

For example, the measurement value includes at least one of L1-RSRP (Reference Signal Received Power), and L1-SINR (Signal to Interference plus Noise Ratio).

Since the interval between the N reference signal resources in the time domain is less than the threshold, the terminal needs to use a plurality of antenna panels to receive the reference signal on the N reference signal resources at the same time. Each antenna panel corresponds to one receiving beam of the terminal. Each receiving beam may correspond to the measured value of at least one reference signal. The terminal may record the reference signal identification and the receiving beam corresponding to the maximum measurement value, and the receiving beam corresponding to the maximum measurement value is the strongest receiving beam corresponding to the reference signal identification. The correspondence between the reference signal identification and the strongest receiving beam is stored locally to facilitate subsequent use of the strongest receiving beam to receive data sent by the network device using the sending beam corresponding to the reference signal identification.

In step 308, the terminal sends a beam measurement report.

In some embodiments, the terminal sends the beam measurement report by means including, but not limited to, periodic sending, semi-static sending or acyclic sending. In some embodiments, the beam measurement report may be sent via UCI (uplink control information), and the UCI may be sent via PUCCH (Physical Uplink Control Channel) or PUSCH (Physical Uplink Shared Channel).

In some embodiments, the manner of sending the beam measurement report is indicated by the network-side device, for example, through a combination of one or more of RRC signaling, MAC (Medium Access Control) signaling, and DCI (Downlink Control Information) signaling.

In a possible implementation, the beam measurement report is a group-based beam measurement report, the group-based beam measurement report includes identifications of M reference signals and measured values of the M reference signals, the M reference signals are M reference signals among the reference signals sent via the N reference signal resources, M is an integer greater than 0 and not greater than N, i.e., the group-based measurement report carries the measurement values corresponding to the reference signals received by the terminal at the same time. As mentioned above, for a reference signal sent by the network-side device, the terminal side may or may not receive this reference signal, or the power received is too small, so that the number of reference signals identified in the beam measurement report is less than or equal to the number of reference signals sent by the network-side device, i.e., M is less than or equal to N.

In an embodiment of the present disclosure, each of the measured values of the M reference signals in the beam measurement report is the maximum measured value of each reference signal.

In some embodiments, the beam measurement report includes an identification of a first reference signal and an absolute measurement value of the first reference signal, an identification of a second reference signal and a relative measurement value of the second reference signal, and the relative measurement value of the second reference signal is the difference between the absolute measurement value of the second reference signal and the absolute measurement value of the first reference signal.

Since the relative measurement value occupies fewer bits than the absolute measurement value, when the beam measurement report includes the absolute measurement value of one reference signal and the relative measurement value of at least one reference signal, it may save signaling overhead. It should be noted that in other embodiments, the measurement values in the beam measurement report may all be absolute measurement values.

For example, the absolute measurement value is the largest absolute measurement value among all absolute measurements corresponding to the reference signal received by the terminal.

In another possible implementation, the beam measurement report is in units of reference signal, i.e., each reference signal corresponds to one beam measurement report.

In step 309, the network-side device receives the beam measurement report.

After receiving the beam measurement report from the terminal, the network-side device performs beam management based on the beam measurement report.

In the embodiments of the present disclosure, since the interval, by which the N reference signal resources in the same reference signal resource set are spaced apart in the time domain, is smaller than the first threshold, a terminal may transmit the reference signal for beam management on the N reference signal resources simultaneously through a plurality of antenna panels, and since each reference signal corresponds to one sending beam of the network-side device, the beam management may be performed based on a plurality of reference signals transmitted simultaneously, which is conducive to improving the efficiency of beam management.

Figure 5:
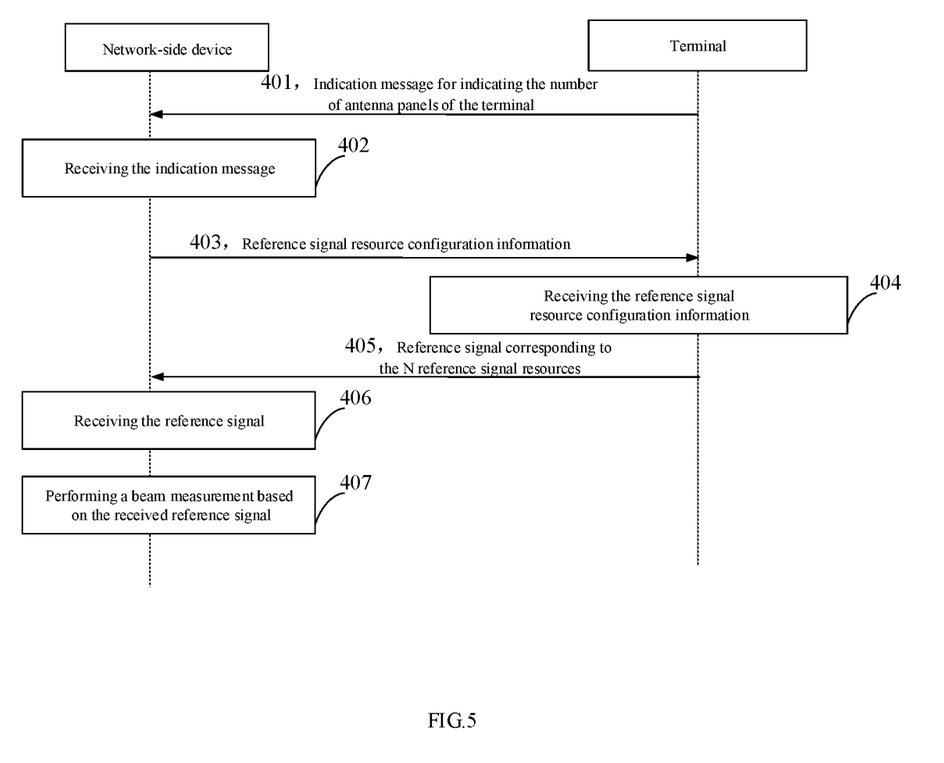
FIG. 5 is a flowchart of a method for signal transmission according to an embodiment.

In addition to the process shown in FIG. 4 for downlink beam management, the method according to an embodiment of the present disclosure can also be applied to uplink beam management. FIG. 5 is a flow chart of a method for signal transmission according to an embodiment. Referring to FIG. 5, the method includes the following steps.

In step 401, a terminal sends an indication message for indicating the number of antenna panels of the terminal.

In step 402, a network-side device receives the indication message.

In step 403, the network-side device sends reference signal resource configuration information.

In step 404, the terminal receives the reference signal resource configuration information.

The details of steps 401 to 404 may refer to steps 301 to 304 and a detailed description is not repeated herein.

In step 405, the terminal sends the reference signal on N reference signal resources by using different antenna panels. The different antenna panels correspond to different reference signal resources. Here, the different antenna panels send beams in different directions.

In the step 405, the reference signal includes an SRS.

In step 406, the network-side device receives the reference signal sent by the terminal.

The network-side device receives the reference signal sent by the terminal on different reference signal resources via N TRPs. The reference signal resources used by different TRPs are different.

In step 407, the network-side device performs a beam measurement based on the received reference signal.

Based on the beam measurement result, the network-side device can perform uplink beam management from the terminal to the network-side device.

Figure 6:
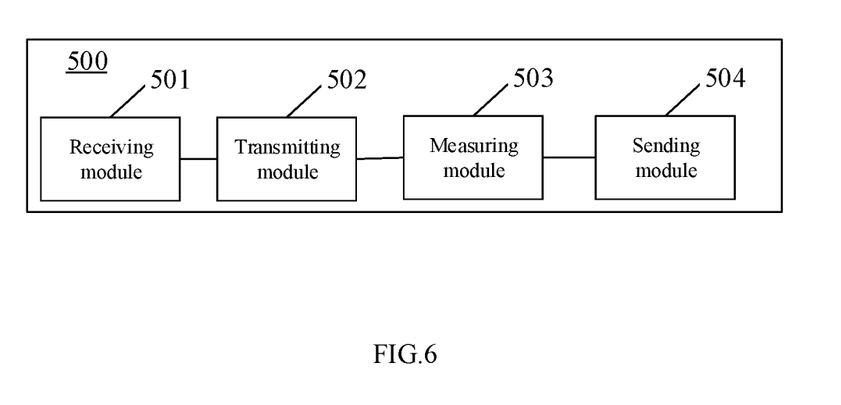
FIG. 6 is a schematic diagram of a structure of a device for signal transmission according to an embodiment.

FIG. 6 is a schematic diagram of a structure of a device for signal transmission according to an embodiment. The device has a function of the terminal for implementing the above method embodiments. The function may be implemented by a hardware or by the hardware executing a corresponding software. As shown in FIG. 6, the device 500 includes a receiving module 501 and a transmitting module 502.

The receiving module 501 is configured to receive reference signal resource configuration information, the reference signal resource configuration information includes a configuration of at least one reference signal resource set, the reference signal resource set include N reference signal resources, an interval, by which the N reference signal resources are spaced apart in a time domain, is smaller than a first threshold, and the reference signal resource is configured to carry a reference signal for beam management. The transmitting module 502 is configured to transmit the reference signal on the N reference signal resources. N is an integer greater than 1.

In some embodiments, the N reference signal resources include at least a first reference signal resource and a second reference signal resource, and the first reference signal resource and the second reference signal resource satisfy any one of the following relationships:

the first reference signal resource and the second reference signal resource occupy the same one or more symbols in the time domain; and the first reference signal resource and the second reference signal resource occupy different symbols in the time domain, a number of symbol intervals between an end symbol occupied by the first reference signal resource and a start symbol occupied by the second reference signal resource is greater than or equal to 0 and smaller than X, and the end symbol occupied by the first reference signal resource is earlier than the start symbol occupied by the second reference signal resource. For example, X is a set value and is a positive integer.

In some embodiments, a configuration of the reference signal resource includes a reference signal identification corresponding to the reference signal resource, a time domain resource of the reference signal resource, a frequency domain resource of the reference signal resource, and a number of antenna ports of the reference signal resource.

In some embodiments, the configuration of the reference signal resource further includes: a terminal-side antenna panel identification and/or a network-side device antenna panel identification corresponding to the reference signal resource.

In some embodiments, the reference signal resource configuration information includes a configuration of at least two reference signal resource sets, an interval in the time domain between any reference signal resource in one of the reference signal resource sets and any reference signal resource in another one of the reference signal resource sets is greater than or equal to a second threshold, and the second threshold is greater than or equal to the first threshold.

In some embodiments, the N reference signal resources correspond to different transmission reception points (TRPs) of a network-side device.

In some embodiments, the transmitting module is configured to: send the reference signal on different reference signal resources by using different antenna panels, the different antenna panels corresponding to different reference signal resources; or receive the reference signal on the reference signal resources by using the different antenna panels.

In some embodiments, the reference signal sent includes an SRS; and the reference signal received includes at least one of SSB, CSI-RS, and PRS.

In some embodiments, the device further includes a measuring module 503 and a sending module 504. The measuring module 503 is configured to perform a beam measurement based on the reference signal received; and the sending module 504 is configured to send a beam measurement report.

In a possible implementation, the beam measurement report is a group-based beam measurement report, the group-based beam measurement report includes identifications of M reference signals and measurement values of the M reference signals, the M reference signals are from the reference signals sent through the N reference signal resources, and M is an integer greater than 0 and smaller than or equal to N.

In a possible implementation, the beam measurement report includes an identification of a first reference signal and an absolute measurement value of the first reference signal, an identification of a second reference signal and a relative measurement value of the second reference signal, and the relative measurement value of the second reference signal is a difference between the absolute measurement value of the second reference signal and the absolute measurement value of the first reference signal.

In some embodiments, the sending module 504 is further configured to send an indication message for indicating a number of antenna panels of the terminal, N being smaller than or equal to the number indicated by the indication message.

Figure 7:
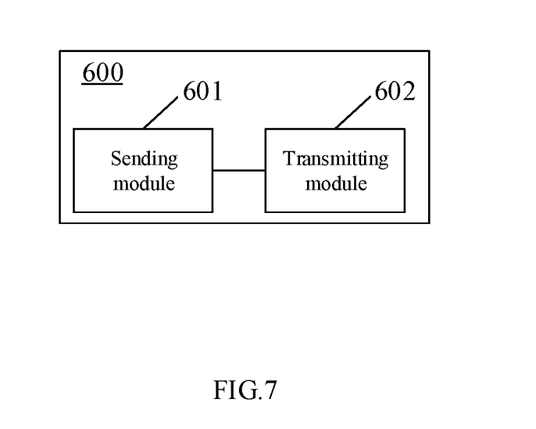
FIG. 7 is a schematic diagram of a structure of a device for signal transmission according to an embodiment.

FIG. 7 is a schematic diagram of a structure of a device for signal transmission according to an embodiment. The device has a function of the network-side device for implementing the above method embodiments. The function may be implemented by a hardware or by the hardware executing a corresponding software. As shown in FIG. 7, the device 600 includes a sending module 601 and a transmitting module 602.

The sending module 601 is configured to send reference signal resource configuration information, the reference signal resource configuration information includes a configuration of at least one reference signal resource set, the reference signal resource set includes N reference signal resources, an interval, by which the N reference signal resources are spaced apart in a time domain, is smaller than a first threshold, and the reference signal resource is configured to carry a reference signal for beam management. The transmitting module 602 is configured to transmit the reference signal on the N reference signal resources. N is an integer greater than 1.

In some embodiments, any two of the N reference signal resources are a first reference signal resource and a second reference signal resource, and the first reference signal resource and the second reference signal resource satisfy any one of the following relationships:

the first reference signal resource and the second reference signal resource occupy the same one or more symbols in the time domain; and the first reference signal resource and the second reference signal resource occupy different symbols in the time domain, a number of symbol intervals between an end symbol occupied by the first reference signal resource and a start symbol occupied by the second reference signal resource is smaller than X, and the end symbol occupied by the first reference signal resource is earlier than the start symbol occupied by the second reference signal resource, for example, X is a set value and is a positive integer.

In some embodiments, a configuration of the reference signal resource includes a reference signal identification corresponding to the reference signal resource, a time domain resource of the reference signal resource, a frequency domain resource of the reference signal resource, and a number of antenna ports of the reference signal resource.

In some embodiments, the configuration of the reference signal resource further includes: a terminal-side antenna panel identification and/or a network-side device antenna panel identification corresponding to the reference signal resource.

In some embodiments, the reference signal resource configuration information includes a configuration of at least two reference signal resource sets, an interval in the time domain between any reference signal resource in one of the reference signal resource sets and any reference signal resource in another one of the reference signal resource sets is greater than or equal to a second threshold, and the second threshold is greater than or equal to the first threshold.

In some embodiments, the transmitting module 602 is configured to send the reference signal on different reference signal resources through N transmission reception points (TRPs), the reference signal resources used by different TRPs being different; or receive the reference signal on the different reference signal resources through the N transmission reception points (TRPs), the reference signal resources used by the different TRPs being different.

In some embodiments, the reference signal received includes SRS; and the reference signal sent includes at least one of SSB, CSI-RS, and PRS.

In some embodiments, the N transmission reception points (TRPs) belong to one or more network-side devices.

In some embodiments, the transmitting module 602 is further configured to receive a beam measurement report.

In a possible implementation, the beam measurement report is a group-based beam measurement report, the group-based beam measurement report includes identifications of M reference signals and measurement values of the M reference signals, the M reference signals are from the reference signals sent through the N reference signal resources, and M is an integer greater than 0 and smaller than or equal to N.

In a possible implementation, the beam measurement report includes an identification of a first reference signal and an absolute measurement value of the first reference signal, an identification of a second reference signal and a relative measurement value of the second reference signal, and the relative measurement value of the second reference signal is a difference between the absolute measurement value of the second reference signal and the absolute measurement value of the first reference signal.

In some embodiments, the transmitting module 602 is further configured to receive an indication message for indicating a number of antenna panels of the terminal, N being smaller than or equal to the number indicated by the indication message.

Figure 8:
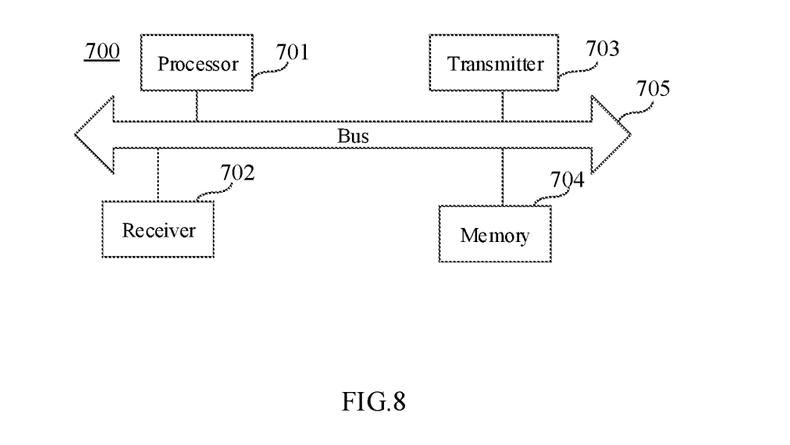
FIG. 8 is a block diagram of a terminal according to an embodiment.

FIG. 8 is a block diagram of a terminal 700 according to an embodiment. As shown in FIG. 8, the terminal 700 may include a processor 701, a receiver 702, a transmitter 703, a memory 704 and a bus 705.

The processor 701 includes one or more processing cores, and the processor 701 performs various functional applications and information processing by running software programs and modules.

The receiver 702 and the transmitter 703 may be implemented as a single communication component, which may be a communication chip.

The memory 704 is connected to the processor 701 via the bus 705.

The memory 704 may be used to store at least one instruction. The processor 701 is used to execute the at least one instruction to perform the method performed by the terminal in the method for signal transmission according to an embodiment of the present disclosure.

In addition, the memory 704 may be implemented by any type of volatile or non-volatile storage device or a combination thereof. The volatile or non-volatile storage devices include but not limited to a magnetic disk or optical disk, electrically erasable programmable read-only memory (EEPROM), erasable programmable read-only memory (EPROM), Static Random Access Memory (SRAM), read-only memory (ROM), magnetic memory, flash memory, programmable read-only memory (PROM).

In an embodiment, there is also provided a computer readable storage medium. The computer readable storage medium has at least one instruction, at least one program, code set or instruction set stored therein. The at least one instruction, at least one program, code set or instruction set is loaded and executed by the processor to implement the method for signal transmission provided by each of the above method embodiments.

Figure 9:
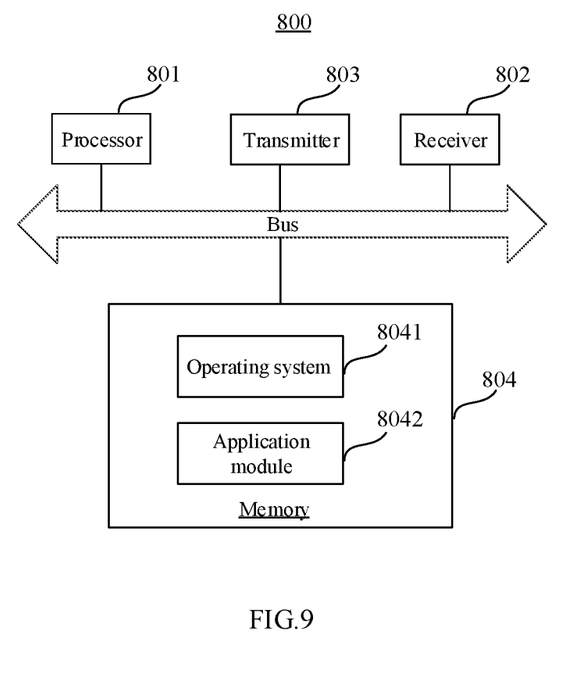
FIG. 9 is a block diagram of a network-side device according to an embodiment.

FIG. 9 is a block diagram of a network-side device 800 according to an embodiment. As shown in FIG. 9, the network-side device 800 may include a processor 801, a receiver 802, a transmitter 803 and a memory 804. The receiver 802, the transmitter 803 and the memory 804 are each connected to the processor 801 via a bus.

The processor 801 includes one or more processing cores. The processor 801 runs software programs and modules to perform the methods performed by the network-side device in the method for signal transmission provided by the embodiment of the present disclosure. The memory 804 may be used to store the software program and the module. Specifically, the memory 804 may store an operating system 8041, an application module 8042 for at least one function. The receiver 802 is used to receive communication data sent by other devices and the transmitter 803 is used to send communication data to other devices.

In an embodiment, there is also provided a computer readable storage medium. The computer readable storage medium has at least one instruction, at least one program, code set or instruction set stored therein. The at least one instruction, at least one program, code set or instruction set is loaded and executed by the processor to implement the method for signal transmission provided by each of the above method embodiments.

An embodiment of the present disclosure further provides a communication system. The communication system includes a terminal and a network-side device. The terminal is the terminal as provided in the embodiment shown in FIG. 8. The network-side device is the network-side device as provided in the embodiment shown in FIG. 9.

In the embodiments of the present disclosure, since the interval, by which the N reference signal resources in the same reference signal resource set are spaced apart in the time domain, is smaller than the first threshold, a terminal may transmit the reference signal for beam management on the N reference signal resources simultaneously through a plurality of antenna panels, and since each reference signal corresponds to one beam of the network-side device, the beam management may be performed based on a plurality of reference signals transmitted simultaneously, which is conducive to improving the efficiency of beam management.

Those skilled in the art may easily conceive of other embodiments of the present disclosure after considering the specification and practicing the invention disclosed herein. The present application is intended to cover any variations, uses or adaptations of the present disclosure that follow the general principles of the present disclosure and include the common knowledge or the conventional technical means in the art that are not disclosed herein. The description and embodiments are to be considered exemplary only and the true scope and spirit of the present disclosure is indicated by the following claims.

It should be understood that the present disclosure is not limited to the precise construction already described above and illustrated in the accompanying drawings, and that various modifications and changes may be made without departing from the scope thereof.

What is claimed is:

1. A method for signal transmission, comprising:
   receiving, by a terminal, reference signal resource configuration information from a network-side device, wherein the reference signal resource configuration information being configured to indicate a configuration of at least one reference signal resource set, the reference signal resource set corresponding to N reference signal resources, an interval, by which any adjacent two of the N reference signal resources are spaced apart in a time domain, being smaller than a first threshold, the first threshold being a time required for switching between different beam directions on a same antenna panel of the terminal, and the reference signal resource being configured to carry a reference signal for beam management; and
   transmitting the reference signal on the N reference signal resources,
   wherein N is an integer greater than 1.

2. The method according to claim 1, wherein the N reference signal resources comprise at least a first reference signal resource and a second reference signal resource, and the first reference signal resource and the second reference signal resource satisfy any one of the following relationships:
   the first reference signal resource and the second reference signal resource occupy the same one or more symbols in the time domain; and
   the first reference signal resource and the second reference signal resource occupy different symbols in the time domain, a number of symbol intervals between an end symbol occupied by the first reference signal resource and a start symbol occupied by the second reference signal resource is greater than or equal to 0 and smaller than X, and the end symbol occupied by the first reference signal resource is earlier than the start symbol occupied by the second reference signal resource, wherein X is a set value and is a positive integer.

3. The method according to claim 1, wherein a configuration of the reference signal resource comprises at least one of the following:
a reference signal identification corresponding to the reference signal resource;
a time domain resource of the reference signal resource;
a frequency domain resource of the reference signal resource; and
a number of antenna ports of the reference signal resource.

4. The method according to claim 1, wherein the reference signal resource configuration information comprises a configuration of at least two reference signal resource sets, an interval in the time domain between any reference signal resource in one of the reference signal resource sets and any reference signal resource in another one of the reference signal resource sets is greater than or equal to a second threshold, and the second threshold is greater than or equal to the first threshold.

5. The method according to claim 1, wherein the N reference signal resources correspond to different transmission reception points (TRPs) of a network-side device.

6. The method according to claim 1, wherein the transmitting the reference signal on the N reference signal resources comprises:
sending the reference signal on different reference signal resources by using different antenna panels, the different antenna panels corresponding to different reference signal resources; or
receiving the reference signal on the reference signal resources by using the different antenna panels.

7. The method according to claim 6, further comprising:
performing a beam measurement based on the reference signal received; and
sending a beam measurement report.

8. The method according to claim 7, wherein the beam measurement report is a group-based beam measurement report, the group-based beam measurement report comprises identifications of M reference signals and measurement values of the M reference signals, the M reference signals are from the reference signals sent through the N reference signal resources, and M is an integer greater than 0 and smaller than or equal to N.

9. The method according to claim 7, wherein the beam measurement report comprises an identification of a first reference signal and an absolute measurement value of the first reference signal, an identification of a second reference signal and a relative measurement value of the second reference signal, and the relative measurement value of the second reference signal is a difference between the absolute measurement value of the second reference signal and the absolute measurement value of the first reference signal.

10. The method according to claim 1, further comprising:
sending an indication message for indicating a number of antenna panels of a terminal, N being smaller than or equal to the number indicated by the indication message.

11. A method for signal transmission, comprising:
sending, by a network-side device, reference signal resource configuration information, the reference signal resource configuration information being configured to indicate a configuration of at least one reference signal resource set, the reference signal resource set corresponding to N reference signal resources, an interval, by which any adjacent two of the N reference signal resources are spaced apart in a time domain, being smaller than a first threshold, the first threshold being a time required for switching between different beam directions on a same antenna panel of the terminal, and the reference signal resource being configured to carry a reference signal for beam management; and
transmitting the reference signal on the N reference signal resources,
wherein N is an integer greater than 1.

12. The method according to claim 11, wherein the N reference signal resources comprise at least a first reference signal resource and a second reference signal resource, and the first reference signal resource and the second reference signal resource satisfy any one of the following relationships:
the first reference signal resource and the second reference signal resource occupy the same one or more symbols in the time domain; and
the first reference signal resource and the second reference signal resource occupy different symbols in the time domain, a number of symbol intervals between an end symbol occupied by the first reference signal resource and a start symbol occupied by the second reference signal resource is smaller than X, and the end symbol occupied by the first reference signal resource is earlier than the start symbol occupied by the second reference signal resource, wherein X is a set value and is a positive integer.

13. The method according to claim 11, wherein a configuration of the reference signal resource comprises at least one of the following:
a reference signal identification corresponding to the reference signal resource;
a time domain resource of the reference signal resource;
a frequency domain resource of the reference signal resource; and
a number of antenna ports of the reference signal resource.

14. The method according to claim 11, wherein the reference signal resource configuration information comprises a configuration of at least two reference signal resource sets, an interval in the time domain between any reference signal resource in one of the reference signal resource sets and any reference signal resource in another one of the reference signal resource sets is greater than or equal to a second threshold, and the second threshold is greater than or equal to the first threshold.

15. The method according to claim 11, wherein the transmitting the reference signal on the N reference signal resources comprises:
sending the reference signal on different reference signal resources through N transmission reception points (TRPs), the reference signal resources used by different TRPs being different; or
receiving the reference signal on the different reference signal resources through the N transmission reception points (TRPs), the reference signal resources used by the different TRPs being different.

16. The method according to claim 15, wherein the N transmission reception points (TRPs) belong to one or more network-side devices.

17. The method according to claim 15, further comprising:
receiving a beam measurement report, wherein the beam measurement report is a group-based beam measurement report, the group-based beam measurement report comprises identifications of M reference signals and measurement values of the M reference signals, the M reference signals are from the reference signals sent through the N reference signal resources, and M is an integer greater than 0 and smaller than or equal to N.

18. The method according to claim 15, further comprising:
   receiving a beam measurement report,
   wherein the beam measurement report comprises an identification of a first reference signal and an absolute measurement value of the first reference signal, an identification of a second reference signal and a relative measurement value of the second reference signal, and the relative measurement value of the second reference signal is a difference between the absolute measurement value of the second reference signal and the absolute measurement value of the first reference signal.

19. The method according to claim 11, further comprising:
   receiving an indication message for indicating a number of antenna panels of a terminal, N being smaller than or equal to the number indicated by the indication message.

20. A terminal, comprising:
   a processor; and
   a memory, storing executable instructions by the processor,
   wherein the processor is configured to load and perform the executable instructions to implement a method for signal transmission comprising:
   receiving reference signal resource configuration information from a network-side device, the reference signal resource configuration information being configured to indicate a configuration of at least one reference signal resource set, the reference signal resource set corresponding to N reference signal resources, an interval, by which any adjacent two of the N reference signal resources are spaced apart in a time domain, being smaller than a first threshold, the first threshold being a time required for switching between different beam directions on a same antenna panel of the terminal, and the reference signal resource being configured to carry a reference signal for beam management; and
   transmitting the reference signal on the N reference signal resources,
   wherein N is an integer greater than 1.

* * * * *